United States Patent
Weberg et al.

(10) Patent No.: US 7,267,881 B2
(45) Date of Patent: Sep. 11, 2007

(54) PROTECTIVE SURFACE MODIFICATION SYSTEM AND APPLICATION TO SUBSTRATES

(76) Inventors: Rolf Thomas Weberg, 107 N. Grove St., East Aurora, NY (US) 14052; Shitong Zhu, 404 Delta Rd. Apt. 4, Amherst, NY (US) 14226; Timothy James Sanford, 10734 Lebanon Rd., Randolph, NY (US) 14772; Lawrence J. Simmons, 251 Le Havre Dr., Cheektowaga, NY (US) 14227

( * ) Notice: Subject to any disclaimer, the term of this patent is extended or adjusted under 35 U.S.C. 154(b) by 259 days.

(21) Appl. No.: 11/132,835

(22) Filed: May 19, 2005

(65) Prior Publication Data
US 2006/0263611 A1  Nov. 23, 2006

(51) Int. Cl.
B32B 27/16 (2006.01)
B32B 27/18 (2006.01)

(52) U.S. Cl. .................. 428/447; 428/484.1; 428/520; 428/522; 427/407

(58) Field of Classification Search ............. 428/447, 428/484.1, 520; 427/407.1
See application file for complete search history.

(56) References Cited

U.S. PATENT DOCUMENTS

| 3,201,361 A | 8/1965 | Aron |
| 4,001,368 A | 1/1977 | Michizoe et al. |
| 4,356,144 A * | 10/1982 | Cheung et al. ............. 376/203 |
| 4,656,202 A * | 4/1987 | Nason et al. ................. 522/89 |
| 5,523,337 A | 6/1996 | Banerjee et al. |
| 5,716,667 A * | 2/1998 | Kashiwada et al. ......... 427/156 |
| 5,821,291 A | 10/1998 | Blackburn et al. |
| 5,968,238 A * | 10/1999 | Healy et al. ................... 106/3 |
| 6,448,302 B1 * | 9/2002 | Dawson et al. ................ 522/8 |
| 6,579,923 B2 * | 6/2003 | Paiva et al. ................. 524/262 |
| 2002/0110692 A1 | 8/2002 | Suzuki et al. |
| 2006/0263611 A1 * | 11/2006 | Weberg et al. .............. 428/443 |

FOREIGN PATENT DOCUMENTS

| EP | 0 486 278 | * | 5/1992 |
| EP | 0 894 597 A2 | | 3/1999 |
| JP | 2004-99645 | * | 12/2004 |
| WO | WO 00/58024 | | 10/2000 |
| WO | WO 03/064061 A1 | | 8/2003 |
| WO | WO 2005/113664 | * | 1/2005 |

* cited by examiner

Primary Examiner—D. Lawrence Tarazano

(57) ABSTRACT

A protective surface modification system employs two separate formulations to enhance visual appearance and in many instances provide abrasion resistance on a surface such as a countertop.

16 Claims, No Drawings

PROTECTIVE SURFACE MODIFICATION SYSTEM AND APPLICATION TO SUBSTRATES

FIELD OF INVENTION

This invention relates to a protective surface modification system and its application for use on surfacing materials such as countertops wherein an attractive surface appearance is necessary coupled with an ability of an exposed surface to withstand abrasion and provide stain resistance.

DESCRIPTION OF RELATED ART

A broad range of coating compositions are marketed for coating a variety of surfacing materials, ranging from curable materials to sacrificial compositions. Generally, cured coatings are more robust but often contain solvents, co-solvents, and carriers that may cause environmental issues in both the workplace and the general environment. Sacrificial compositions have the obvious property of easily being worn away, but can be easily reapplied when desired to maintain the aesthetics and/or performance of the surfacing material.

The method of application of these coating compositions affects appearance and function. It is critical to deliver a uniform amount of material to the surface to avoid visual defects. Therefore, coating compositions may require somewhat complicated systems to apply them evenly. Examples of coatings processes used include spray systems, electrostatic systems, and doctor blade systems. These coating systems most often require significant investment in equipment and environmental controls such as spray booths and filtration systems and are unacceptable in a small shop environment.

There is a need for a hand-applied, user-friendly, curable coating composition for hard surfaces that imparts improved aesthetics and material protection, and can be used in a fabrication shop or on site at an installation such as a home without safety issues.

SUMMARY OF THE INVENTION

The present invention is directed to a method of applying a protective surface modification system to provide at least one of an enhanced visual appearance, an attractive tactile characteristic, and an improved abrasion-resistance and a coated article formed thereby. The method comprises:
(a) applying to a substrate a composition comprising:
 (i) an ultraviolet curable ethylenically unsaturated resin;
 (ii) a solvent for the ultraviolet curable resin, which is substantially inert to the substrate or primer layer;
 (iii) an emulsifier;
 (iv) an ultraviolet initiator;
 (v) water.
(b) curing the composition of (a) by ultraviolet radiation to form a solid coating;
(c) applying to the solid coating of (b) a composition comprising:
 (i) a wax having a melting point of at least 60° C.,
 (ii) a solvent for the wax which is substantially inert to the solid coating of (b);
 (iii) an amino functional silicone;
 (iv) a silicone which is not amino functional;
 (v) one or more mineral oils
 (vi) water.

DETAILED DESCRIPTION OF THE INVENTION

Although any substrate may be employed where surface enhancement is desirable, a primary substrate for the present invention is typically one employed in building construction and is conventionally referred to in the art as a solid surface material. Such substrate may be employed in a horizontal mode such as a countertop or in a vertical mode such as a wall surface covering. A preferred substrate of the present invention functions as a kitchen countertop.

The two-step coating modification, which is also referred to herein as a surface modification system, when applied to a substrate improves the surface appearance, including sheen. It also improves the tactile characteristics of the surface, and the stain resistance, cleanability, and the ability to withstand abrasion due to constant use. The modified surface also withstands contact with both highly basic and highly acidic foods as well as some cleaning chemicals.

Accordingly, the coating or surface modification system of the invention enhances the color, i.e. sheen, depth of image of the substrate and, depending on the substrate, may provide improved stain resistance and abrasion resistance.

The formulations of the invention are easy to apply by hand, have low VOC emissions in a preferred mode, produce minimal waste, are economical and easily transportable. A fabricator and/or installer of the substrate is able to apply the surface modification system to a substrate either directly or to a primer layer in a fabrication shop or in the field such as a home. The application is useful for new installations as well as refurbishing existing installations.

The method of application of the present invention employs two separate formulations. The first step modification formulation is a UV curable formulation which serves to anchor the second step formulation. It has been found that the enhancements of the modification system can be restored by periodically reapplying the second step formulation, with no need to reapply the first step formulation.

SUBSTRATE

The present invention is suitable for substrates where surface modification is desirable. In general, substrates will fall into several distinct classes, a material comprised of (a) polymer only, (b) a material comprised of at least 50% by weight polymer but also containing a filler, (c) a material of at least 80% by weight mineral and also containing a polymer binder, and (d) a mineral material which does not contain polymer.

A well-known example of a polymer and filler substrate, is sold as Corian® solid surface by E. I. du Pont de Nemours. A further example of such a substrate is one in which the polymer functions as a binder in a material which is primarily mineral particles. An example is Zodiaq® quartz surfacing, also sold by E. I. du Pont de Nemours and Company.

Substrates comprised of all mineral components include natural stone and manmade stone such as granite, quartz, sandstone, soapstone, marble, concrete, terrazzo, and the like. The modification system of the present invention is found particularly useful on dimensioned natural stone used as building products, such as granite countertops.

First Step Surface Modification Formulation

Resin

As employed herein, an ethylenically unsaturated resin denotes components of polymer, oligomer and monomer separately or in combination.

Useful resins include, but are not limited to those monomers, oligomers, and polymers derived from esters of acrylic acid, esters of methacrylic acid, urethane acrylates, urethane methacrylates, epoxy acrylates, epoxy methacrylates, melamine acrylates, melamine methacrylates, acrylate-functionalized unsaturated polyesters, methacrylate-functionalized unsaturated polyesters, vinyl monomers, allylic monomers, urethanes, acrylics, epoxies, unsaturated polyesters, siloxanes, silanes, and combinations thereof. A preferred class includes an acrylic functionalized resin. By "acrylic functionalized" is meant a material having at least one reactive acrylic or methacrylic group appended thereto. Such resin is a component of the first step formulation applied to the substrate or a primer layer.

In a preferred mode the resin will be employed in dilute form as a minor portion of the overall first step formulation to allow hand application. Generally, a maximum of not more than 35% by weight, more preferably not more than 30% resin by weight, is used. A practical lower limit is 10% by weight.

Solvent for the Ultraviolet Curable Resin

A solvent for the ultraviolet ethylenically unsaturated resin is chosen so that it is volatile at room temperature and is substantially inert to the substrate or primer layer, if employed. Conventional solvents include toluene, xylene, butyl acetate, acetone, methyl isobutyl ketone, methyl ethyl ketone, methanol, isopropanol, butanol, hexane, ethylene glycol, propylene glycol, propylene glycol monoethyl ether, naptha and mineral spirits.

A preferred solvent class is known as mineral spirits. Mineral spirits are understood to mean any of the various light hydrocarbons that are distillates of petroleum and specified according to ASTM D235-02 "Standard Specification for Mineral Spirits (Petroleum Spirits)". A preferred solvent, odorless mineral spirits (OMS), is understood to mean any of the above mineral spirits which are further refined to have an aromatic content less than 1%. Specifically, OMS cuts that have a boiling point range of 300-365° F. and a density range of 0.75-0.78 g/cc are most preferred.

Emulsifier

Emulsifiers useful for the present invention may be a broad range of materials well known in the art. Their function is to compatibilize and stabilize mixtures of unlike materials such as oil and water. These materials may be anionic, cationic or nonionic in nature. They may be derived from and/or be comprised of fatty acids, natural oils, amines, ammonium salts, silicones, polyethers, oligomers, co-oligomers, polymers, copolymers, natural product extracts and the like.

It is found that an emulsifier formed in-situ is most useful. One or more components are included in each of the two or more phases to be combined, and upon combination, the two or more phases react to create an emulsifier to result in a stable emulsion composition. As one of the components is commonly classified as an emulsifier, and its corresponding component is commonly classified as a surfactant, these can be considered emulsifier/surfactant systems. For purposes of this invention, emulsifier is understood to include the emulsifer/surfactant systems that are formed in-situ. An example of such an emulsifier/surfactant system is E-Z-Mulse® from Florida Chemical Company, Inc of Winter Haven, Fla.

Exemplary emulsifiers include morpholine oleate soap, oleic acid triethanolamine soap, oleic acid/morpholine mixtures, oleic acid/triethanolamine mixtures, stearic acid/morpholine mixtures, stearic acid/triethanolamine mixtures, sodium oleate, sodium alkyl benzene sulfonate, polyoxyethylene alkylphenol ether, polyoxyethylene alkyl ether, polyoxyethylene fatty acid esters, ethylene oxide adducts of nonyl phenol, sorbitan mono-oleate, and mixtures of these emulsifiers. Depending on the formulation of components, the coating composition of the present invention may be oil-in-water emulsions, wherein water is the continuous phase and oil is the disperse phase, or water-in-oil emulsions, wherein oil is the continuous phase and water is the disperse phase. The preferred emulsifier is a combination of stearic acid and morpholine which may be added as a stearic acid morpholinium salt.

In situ formation of the emulsifier in this invention entails addition of the morpholine to the water-based fraction and stearic acid to the oil-based fraction. Combination of the two fractions in a mixing process creates the stearic acid morpholinium salt which stabilizes the resulting emulsion.

Additional emulsifiers may be added to further improve the stability of the emulsion versus long term storage under different environmental conditions. Preferably, such additional emulsifiers are chosen from the nonionic class of these compounds.

Ultraviolet Initiator

Photoinitiators are well-known in the art of ultraviolet (UV-) polymerizable coatings. These initiators have strong absorption in the ultraviolet and near-ultraviolet region of the electromagnetic spectrum. Choice of UV initiator, or combinations thereof, can be made to optimize absorption versus the peak wavelength offered by the UV irradiation source. The photoinitiators decompose to provide free radicals which initiate free radical polymerization of the coating when they are exposed to UV radiation of the correct intensity and wavelength. A preferred UV photoinitiator is from the class of phosphineoxide photoinitiators.

Hand application of the UV-curable surface modification results in a thin coating relative to typical spray-applied UV-curable coating. The resulting unfavorable surface-to-volume ratio of the applied surface enhancement makes the UV photocuring much more susceptible to oxygen inhibition versus typical UV-curable coatings.

One method to inhibit oxygen in thin coats is to remove oxygen from the system. This can be accomplished by flooding the area with an inert gas such as nitrogen or argon. This is expensive and introduces potential health and safety hazards. Alternatively, an oxygen barrier can be applied such as an UV-transparent oil. Again, this is impractical in this application.

Oxygen inhibition in thin coatings has also been addressed in the art by addition of initiator adjuvants such as 2-isopropylthioxanthone/4-isopropylthioxanthone (Esacure® ITX, Sartomer Company).

In this invention, a phophineoxide initiator with a suitable UV absorption spectrum is used in combination with 2-isopropylthioxanthone/4-isopropylthioxanthone are used to initiate free radical polymerization of the resin.

Water

Water is a critical component of the first step formulation and acts as the primary carrier agent that aids the formulation to be spread as a thin layer. Once the layer is spread, the water evaporates along with the OMS solvent to leave a thin layer of polymerizable resin composition. Volume of volatile organic constituent (VOC) is greatly reduced by using water as the primary carrier.

Use of distilled or deionized water is highly preferred to avoid introduction of metal ion impurities which could interfere with photocuring and/or shelf life of the composition.

Optional Additives

Various additives can be included in the initial formulation such as to impart physical, visual, and/or tactile performance characteristics. Solid additives in fine particle size can be added to not only adjust rheology, but to also impart improved hardness and scratch resistance, slip modification, etc. Examples include microfine and nano-sized clays, aluminas and silicas, microfine perfluorinated powders, and organic microsphere powders.

Although not critical, a preferred mode of the present invention includes an optional rheology modifier. The rheology modifier is an additive that adjusts the viscosity of the composition to allow greater ease of handling and application. The rheology modifier can be chosen from a variety of materials known as thickeners, associative thickeners, bridging agents and the like. These can be inorganic or organic in nature and are added at low levels to impart the desired effect.

For purposes of illustration the following ranges by weight are suitable: UV curable ethylenically unsaturated resin (15-30%, preferably 18-25%), resin solvent (10-25%, preferably 15-20%), emulsifier such as stearic acid/morpholine-based with nonionic surfactant stabilizer (1-5%, preferably 24%), initiator system (0.1-3%, preferably 1-2%), water such as deionized (40-70%, preferably 45-60%), and optionally rheology modifier such as Bentonite clay (0.1-2%, preferably 0.5-1.5%).

Alternatively, additives to introduce phosphorescent or luminescent pigments to the coating can be used to provide unique aesthetic enhancements. Brightening agents, well-known in the art can also be added to adjust the visual appearance.

Functional additives can be added to introduce antistatic character, anti-microbial/anti-bacterial activity, and UV protection, among others.

Finally, emulsion and resin stabilizers can be added to extend shelf life of the emulsion under various environmental storage conditions by emulsion stabilization and/or inhibition of polymerization.

Application of First Step Formulation

The above-mentioned formulation is applied to a clean, uniform substrate surface by hand application. By hand application is meant application either by hand-held applicator or by hand-held and controlled machine. Once applied, the excess material is removed by hand wiping to leave a thin coating of polymerizable material. At this time water and solvent/carriers have evaporated. The visual appearance of the treated surface will be the appearance after exposure to UV irradiation and subsequent cure.

The above-described and applied formulation is cured employing UV radiation. UV irradiation sources are well-known in the art. UV irradiation sources include new UV light emitting diode (LED) technology which is less dangerous regarding operator exposure compared to standard high energy mercury vapor lamps commonly used in the industry.

Second Step Modification Formulation

A second surface modification is undertaken with a second surface enhancement formulation. The second formulation comprises a wax, a solvent for the wax which is substantially inert to the previously cured coating, an amino functional silicone, a silicone which is not amino functional, one or more mineral oils, and water.

Wax

Preferably the wax has a melting point of at least 60° C. and more preferably 70° C. and most preferably 80-95° C. If the melting point of the wax is unduly low, the wax may be blended with a higher melting first wax. Natural or synthetic waxes are permitted. Useful waxes include paraffinic waxes, microcrystalline waxes, mineral waxes, vegetable waxes, animal waxes, hydrocarbon waxes, organometallic waxes such as aluminum stearates, zinc stearates, and polyoxoaluminum monostearate, hydrogenated oil waxes, and chlorinated waxes.

A preferred wax is carnauba wax or a blend of carnauba wax with another wax.

Wax Solvent

In most cases, the same solvent employed in formation of the first layer can be used. As previously discussed a preferred class of solvents are mineral spirits. Most preferable is the class known as odorless mineral spirits (OMS) defined above which exhibit a desirable evaporation rate and maintain good solvent activity. Also, OMS does not dissolve or otherwise disturb the initial UV-curable application discussed above.

Silicone which is not Amino Functional

Addition of silicone such as an oil to commercial polishes and waxes is well-known in the art to impart greater ease of application, greater water resistance to the final coating, and to reduce surface friction. Typically, one or more molecular weight ranges are employed as mixtures to achieve the desired consistency and performance in the final product. Silicone oils are generally considered to be polydimethylsiloxane oils, but can also include added substitution and functionalities.

Amino Functional Silicone

A specific functionality of interest to the present invention is inclusion of a silicone oil with a primary amine functionality. Additives of this sort are well-known in the art and are added to take advantage of residual unsaturation in the substrate or substrate coating by undergoing Michael Addition reaction with units of unsaturation to thus covalently derivatize the surface with the silicone oil. In this case, this functional silicone is designed to react with unreacted ethylenically unsaturated moieties in the UV-cured first application. Numerous silicone oil emulsions containing amino groups bound via Si—C bonds are known from the literature. Crosslinked silicone structures in emulsion are usually prepared by introduction of T or Q moieties (trifunctional or tetrafunctional siloxane units). A process for preparing silicone microcapsules by means of a reaction of silicones containing acryl and amino groups via a Michael addition is described in U.S. Pat. No. 4,876,039 to Lo, et al.

Mineral Oil

Mineral oil is often added to commercial polishes and to impart greater ease of application, greater water resistance to the final coating, and to reduce surface friction. Typically, one or more molecular weight ranges are employed as mixtures to achieve the desired consistency and performance in the final product. The mineral oil can be combined with silicone oils to achieve the desired effect and to lower material costs.

Water

Water is a critical component of the second step formulation and acts as the primary carrier agent, allowing the formulation to be spread as a thin layer. After application to the substrate, the water evaporates along with the OMS solvent to leave the nonvolatile oils and waxes as a thin, uniform coating. Volume of VOC is greatly reduced versus compositions utilizing organic carriers by using water as the primary carrier. Use of distilled or deionized water is preferred.

Optional Additives

Inorganic clays and diatomaceous earth materials can be added not only as rheology modifiers, but as polishing agents to smooth out and/or fill in surface imperfections that may exist in the substrate. They also act as hazing agents to indicate when the composition has dried and is ready for buffing. An example of useful clay additives are kaolin clays which are anhydrous aluminum silicates and bentonite clays.

Other additives which may be useful in the second step formulation include functional additives which can impart antistatic character, anti-microbial/anti-bacterial activity, UV protection, among others. Solid additives in fine particle size can be added to not only adjust rheology, but to also impart improved hardness and scratch resistance, slip modification, etc. Examples include microfine and nano-sized clays, aluminas and silicas, microfine perfluorinated powders, and organic microsphere powders. Additives to introduce phosphorescent or luminescent pigments to the coating can be used to provide unique aesthetic enhancements. Brightening agents, well-known in the art can also be added to adjust the visual appearance.

Application of Second Step Formulation

The second step formulation is applied to the substrate which has been pretreated with the UV-curable first step formulation. The second step formulation is applied by hand such as a polish or wax is typically applied. By hand application is meant application using a hand-held applicator or a hand-operated mechanical applicator such as a commercial buffer. The formulation is applied to spread it uniformly over the substrate. The material is allowed to dry, which is indicated by a visual hazing. The surface is then hand-buffed to a final finish. Hand-buffing can be accomplished by use of a hand-held buffer cloth or a hand-operated electrical buffer. The resulting surface exhibits a high gloss and a deep aesthetic.

After application of the second composition, the overall application can be reexposed to UV irradiation. By application of the second step formulation, an oxygen barrier, as discussed above, is applied over the exposed first application. Due to the fact that oxygen inhibition is a significant challenge in achieving consistent cure in the first application, a second irradiation with an oxygen barrier in place can serve to further improve the final cure of the overall application. Thus, the second step formulation not only imparts the final aesthetic, it also derivatizes the treated surface and affords enhanced UV-initiated cure of the first composition application.

Optional Primer Treatment

In the cases of an all-mineral or a mineral-filled substrate, a primer treatment may optionally be employed. Such primer treatments are well known particularly for metals, minerals and mineral-filled polymers. They typically involve application of functional silanes, phosphoric acid esters, carboxylic acids, and the like to the surface of the substrate prior to applying any further coating. These materials serve as a tie layer between the substrate and the first step formulation. One such material is gamma-aminopropyl triethoxy silane offered as A-1100 by GE Silicones. Such materials can be applied to the clean substrate surface as dilute solutions in volatile solvents such as isopropyl alcohol or odorless mineral spirits. Application of any optional primer must precede application of the first step formulation.

In the following examples, all parts and percentages are by weight unless otherwise indicated.

EXAMPLE 1

First Step Formulation

The first step formulation was prepared by first mixing 27.35 parts deionized water with 0.5 part Bentone LT (Elementis Specialties) under high shear. When ready, 0.6 part morpholine (99%, Aldrich Chemical) was added. This room temperature aqueous solution was set aside.

In a separate vessel, 27.35 parts deionized water was heated to 200° F. When ready, 0.5 part Bentone LT (Elementis Specialties) was added under high shear. When mixed in, 0.6 part morpholine (99%, Aldrich Chemical) was added. This hot aqueous solution was maintained at 190-200° F. until use.

In a separate vessel, 16.7 parts OMS and 1.35 parts Century 1218 stearic acid (Arizona Chemical) were heated to 170° F. with agitation until the stearic acid was dissolved. This organic solution was added to the heated aqueous solution above.

In a separate vessel, 8.9 parts isobornyl acrylate (SR506, Sartomer Company), 4.8 parts Urethane 8210 (Fairad Company), 8.6 parts Actilane 890 (Akzo Nobel), 0.15 parts UV3530 (BYK-Chemie), 1.2 parts Irgacure 819 (Ciba-Geigy), 0.4 part Esacure ITX (Sartomer Company) and 1.0 part EZ-mulse (Florida Chemical) were mixed at room temperature. This organic solution was added to the room temperature aqueous solution under high shear mixing. When ready, the warm emulsion solution prepared above was added to the room temperature emulsion solution under high shear mixing. Final solution temperature was 110-120° F. Cooling was initiated immediately to minimize time above 100° F. The formulation was cooled to room temperature to provide a stable, light yellow emulsion.

EXAMPLE 2

Second Step Formulation

The second step formulation was prepared by heating 70.1 parts deionized water to 190° F. When hot, 0.3 parts Bentone LT (Elementis Specialties) was added under high shear mixing. 1.6 parts morpholine (99%, Aldrich Chemical) were then added.

The following were combined in a wax melter and heated to 190° F.: 10.44 parts OMS, 2.5 parts GE SF-96 (GE Silicones), 1 part GE Viscocil 5M (General Electric), 1.5 parts Century 1218 stearic acid (Arizona Chemical), 1.5 parts Bleached Montan Wax LGE (Srohmeyer & Aarpe). When ready, the melted organic mixture was added slowly to the above heated aqueous mixture under high shear mixing. When complete, cooling was initiated.

When the solution temperature reached 135° F., a room temperature mixture of 1.56 parts OMS and 1.5 parts GE SF-1706 (GE Silicones) were added under high shear.

When the solution temperature reached 100° F., 8 parts Kaopolite SF (Eastech Specialties) were added under high shear. Cooling was continued to room temperature to yield a stable, white emulsion.

EXAMPLE 3

Application to Solid Surface Substrate

A sample plaque of a dark color alumina trihydrate-filled acrylic solid surface material (Corian®) was prepared by sanding to a matte finish. The prepared coating composition was applied to this surface using a cotton cloth applicator. Once applied, excess coating composition was wiped away using a second clean cloth. Wiping was continued until an even appearance was achieved. The coated surface was then irradiated with UV radiation generated by a four-inch standard mercury arc lamp commonly used in the art.

The resulting surface exhibited a significantly darker appearance with an apparent deeper translucency. The surface also had a silky tactile feel. The coating was not removed by water, mild detergents, standard nonabrasive cleaning agents including household cleaning solutions such as Formula 409® and Windex®, bleach, and ammonia. Everyday scratch whitening damage was reduced as measured in practical testing. Instrumented microscratch (machine description) results showed a 2 to 3-fold increase in the force needed to induce observable scratch whitening by a 1 mm steel ball tool.

The second-step modification formulation was applied over the sample substrate which had been previously coated with the first-step formulation. Immediately, the color of the composite coating was darkened further, the apparent translucency was increased, and the gloss level increased significantly. In addition, the surface resistance was further reduced, providing a smooth tactile feel. Scratch testing demonstrated a further improvement in scratch resistance. The treated surface exhibited increased cleanability and resistance to common household stains.

EXAMPLE 4

Application to Engineered Stone Substrate

The surface modification system described above was applied to a sample plaque of engineered stone (Zodiaq®) prefinished with a matte finish using the technique of Example 3. While no significant impact on scratching or staining was observed, significant aesthetic effects were noted. The apparent colors were darker with a deeper visual aesthetic and the tactile character was smooth and silky to the touch. In addition, presence of the coating caused a higher degree of water beading on the finished surface.

EXAMPLE 5

Application to Granite Substrate

The surface modification system described above was applied to a sample of polished, commercially available granite. No significant impact on scratch resistance was observed. However, significant improvement was noted in preventing stains, particularly oil-based stains such as cooking oil and lard. Visual and tactile effects were also enhanced.

What is claimed is:

1. A method of applying a protective surface modification system to provide an enhanced visual appearance, an attractive tactile characteristic, and an improved abrasion-resistance comprising:
    (a) applying to a substrate either directly or onto a primer layer on the substrate a composition comprising:
        (i) an ultraviolet curable ethylenically unsaturated resin,
        (ii) a solvent for the ultraviolet curable resin, which is substantially inert to the substrate or primer layer;
        (iii) an emulsifier;
        (iv) an ultraviolet initiator;
        (v) water;
    (b) curing the composition of (a) by ultraviolet radiation to form a solid coating; and
    (c) applying to the solid coating of (a) a composition comprising:
        (i) a wax having a melting point of at least 60° C.
        (ii) a solvent for the wax which is substantially inert to the solid coating of (a);
        (iii) an amino functional silicone;
        (iv) a silicone which is not amino functional;
        (v) water.

2. The method of claim 1 wherein the substrate comprises a polymer.

3. The method of claim 1 wherein the substrate comprises a mineral.

4. The method of claim 3 wherein the mineral has a primer coating.

5. The method of claim 1 wherein the ultraviolet ethylenically unsaturated resin is selected from the group derived from ester of acrylic acid, ester of methacrylic acid, urethane acrylate, urethane methacrylate, epoxy acrylate, epoxy methacrylate, melamine acrylate, melamine methacrylate, acrylate-functionalized unsaturated polyester, methacrylate-functionalized unsaturated polyester, vinyl monomer, allylic monomer, urethane, acrylic, epoxy, unsaturated polyester, siloxane, silane, and combination thereof.

6. The method of claim 1 wherein the solvent for the ultraviolet curable resin is selected from the group of toluene, xylene, butyl acetate, acetone, methyl isobutyl ketone, methyl ethyl ketone, methanol, isopropanol, butanol, hexane, ethylene glycol, propylene glycol, propylene glycol monoethyl ether, naptha and mineral spirits.

7. The method of claim 1 wherein the emulsifier is selected from the group of morpholine oleate soap, oleic acid triethanolamine soap, oleic acid/morpholine mixture, oleic acid/triethanolamine mixture, stearic acid/morpholine mixture, stearic acid/triethanolamine mixture, sodium oleate, sodium alkyl benzene sulfonate, polyoxyethylene alkylphenol ether, polyoxyethylene alkyl ether, polyoxyethylene fatty acid ester, ethylene oxide adduct of nonyl phenol, sorbitan mono-oleate, and combination thereof.

8. The method of claim 1 wherein the wax is selected from the group of paraffinic wax, microcrystalline wax, mineral wax, vegetable wax, animal wax, hydrocarbon waxes, organometallic waxes hydrogenated oil wax, chlorinated wax, carnauba wax, and combination thereof.

9. The method of claim 1 wherein the solvent for the wax is odorless mineral spirits.

10. The method of claim 1 wherein the silicone which is not amino functional is a polydimethylsiloxane oil.

11. An article comprising in order:
    (a) a substrate;
    (b) a UV cured coating derived from (i) an ultraviolet curable ethylenically unsaturated resin,
(ii) a solvent for the ultraviolet curable resin, which is substantially inert to the substrate or primer layer;
(iii) an emulsifier;
(iv) an ultraviolet initiator;
(v) water;
(c) a solid coating derived from:
(i) a wax having a melting point of at least 60° C.,
(ii) a solvent for the wax which is substantially inert to the solid coating of (b);
(iii) an amino functional silicone;
(iv) a silicone which is not amino functional;
(v) water.

12. The article of claim 11 wherein the substrate contains at least 50% polymer by weight.

13. The article of claim 11 wherein the substrate contains at least 80% by weight mineral and a polymer binder.

14. The article of claim 11 wherein the substrate is a mineral which does not contain a polymer binder.

15. The article of claim 11 which contains a primer between (a) and (b).

16. The article of claim 11 in the form of a kitchen countertop.

* * * * *